Patented Mar. 14, 1944

2,344,188

UNITED STATES PATENT OFFICE 2,344,188

PROCESS OF PREPARING DIBENZYL

Robert H. Van Schaack, Jr., Evanston, Ill.

No Drawing. Application February 18, 1942,
Serial No. 431,381

10 Claims. (Cl. 260—668)

This invention relates to a process of preparing dibenzyl and more particularly to a process by which may be obtained much higher yields of dibenzyl than has been heretofore possible.

The preparation of dibenzyl by a Friedel-Crafts reaction has been known. However, this reaction as heretofore practiced in the art, has produced relatively small yields of dibenzyl and has normally produced from 20 to 40 per cent of high boiling by-products which it has been necessary to discard. Because of the poor yields normally resulting from this process as used in the art, other methods have usually been preferred for the preparation of dibenzyl, for instance, the preparation of dibenzyl from benzyl chloride.

When benzol is reacted with ethylene dichloride in the presence of aluminum chloride in accordance with standard Friedel-Crafts conditions to form dibenzyl, certain by-products are produced which boil at a temperature higher than the boiling point of dibenzyl. These by-products form a residue which may vary in quantity between 20 and 40 per cent of the combined weight of the dibenzyl and the residue, and have heretofore been found to serve no useful purpose. The yield of dibenzyl, therefore, is normally not greater than 80 per cent and will usually be less than this amount.

With my improved process, the yield of dibenzyl produced from the reaction of benzol and ethylene dichloride may be greatly increased and may even closely approach 100 per cent. The process contemplates the reaction of ethylene dichloride with an excess of benzol in the presence of a Friedel-Crafts catalyst and with a substantial portion of a high boiling residue of a previous reaction between benzol and ethylene dichloride.

In order to use my process, dibenzyl may first be prepared by a Friedel-Crafts reaction, using ethylene dichloride and an excess of benzol in the presence of anhydrous aluminum chloride. If desired, the cost of the process may be decreased without affecting the efficiency of the reaction by substituting aluminum metal, previously struck with a thin copper plate, together with a small amount of anhydrous aluminum chloride for the relatively large quantity of anhydrous aluminum chloride which would otherwise be used.

The following is an example of the preparation of dibenzyl following the standard or normal Friedel-Crafts conditions but using metallic aluminum as above mentioned. Six hundred twenty-four grams of anhydrous benzol and 10 grams of finely ground aluminum which have been struck with copper were placed in a three-necked boiling flask equipped with a thermometer and a reflux condenser. The flask was then heated until the benzol was refluxing. Six hundred twenty-four grams of anhydrous benzol were thoroughly mixed with 198 grams of anhydrous ethylene dichloride and placed in a dropping funnel attached to the flask. Approximately $\frac{1}{10}$ gram of anhydrous aluminum chloride was then added to the mixture in the flask to start the reaction. The mixture in the dropping funnel was then run into the boiling flask at a uniform rate, taking approximately three hours to deliver the entire quantity to the flask. After the entire mixture was received within the flask, the batch was refluxed for approximately one hour. Throughout the operation the flask was heated and the mixture therein maintained a temperature of between 82° C. and 87° C.

The reaction product was washed with water, filtered and the unreacted benzol distilled off. The product was then distilled in a vacuum of approximately 14 mm. pressure up to a temperature of approximately 175° C., at which point substantially all of the dibenzyl had been removed. 233.2 grams of dibenzyl were separated by the distillation while 80.7 grams of residue remained in the flask. Thus the residue remaining in the flask comprised 25.3 per cent of the combined weight of the residue and the dibenzyl.

In my preferred method of preparing dibenzyl, the residue obtained from this reaction of benzol and ethylene dichloride is added to a new reaction mixture of benzol, ethylene dichloride and anhydrous aluminum chloride. In a specific example of this process, 624 grams of benzol were mixed with 198 grams of ethylene dichloride and slowly added to a mixture consisting of the 80.7 grams of the high boiling residue obtained from the reaction described above and 624 grams of benzol, and were treated in the manner described above in connection with the previous example. After the reaction was complete the product was washed, filtered, and distilled to remove unreacted benzol. The dibenzyl was then distilled off. The quantity of dibenzyl obtained from this reaction was 285.6 grams. 119.3 grams of residue remained in the flask. Since 80.7 grams of residue remained in the flask from the previous reaction, the residue formed by this reaction was only 38.6 grams or 11.9 per cent of the combined weight of the dibenzyl and residue formed in this reaction.

I have found that by permitting the high boiling residue to remain in the reaction chamber throughout a large number of reactions, the quantity of high boiling residue is reduced to a minimum. For example, in a series of twelve reactions treated in the manner above described, 3552.7 grams of dibenzyl were prepared while only 106.5 grams of the high boiling residue were produced.

I have found that it is desirable to add to the reaction mixture the entire mixture of by-products or high boiling residue obtained from the previous reaction. These by-products have not been isolated or identified. It seems certain, however, that the residue contains a mixture of several substances, since fractional distillation of the mixture produces a limited separation of the products. Moreover, the residue contains a mixture of liquids and solids, some of them being in the from of tar-like substances.

Although in the specific examples above described approximately 8 mols of benzol were used to each mol of ethylene dichloride, it is, nevertheless, possible to vary this ratio considerably without greatly affecting the reaction products. At least two mols of benzol should, however, be used with each mol of ethylene dichloride in order to obtain a reaction of all of the ethylene dichloride. Furthermore, it is desirable to use a considerable excess of benzol since the use of such an excess appears to be important in maintaining at a minimum the quantity of high boiling residue which is produced. By an excess of benzol I mean a quantity of benzol greater than that required for molecular proportions of the reactants or more than two mols of benzol for each mol of ethylene dichloride.

The quantities of the high boiling residue which may be added to the reaction mixture may be varied considerably without seriously affecting the efficiency of the operation. Thus, although I prefer to use high boiling residue in an amount equal to approximately 45 per cent by weight of the amount of ethylene dichloride used, quantities varying from 25 to 75 per cent of the weight of ethylene dichloride may be used with beneficial results.

The reason for the action of this high boiling residue in inhibiting the formation of additional residue is not fully understood. It may be that the reaction is affected by the formation of a complex equilibrium. Thus it would be possible for the presence of the high boiling residue to shift the equilibrium away from the formation of more residue and tend to increase the yield of dibenzyl produced. Moreover, the use of an excess of benzol may not only aid in forming the maximum quantities of dibenzyl but may cause the high boiling residue formed in the course of the reaction to react with the benzol to form additional quantities of dibenzyl. However, I do not wish to state that this is the mechanism of the reaction and do not wish to be bound by any specified theory.

Since the composition and structure of the by-products obtained from this reaction are not known, I have referred to the mixture as a high boiling residue of a reaction between benzol and ethylene dichloride. By this I refer to the products obtained from such reaction which remain after excess benzol and the dibenzyl are distilled from the reaction mixture.

If the process is not to be carried out in a series of successive reactions, or if for any reason such successive reactions may be undesirable, the yield of dibenzyl may be greatly increased by merely treating the high boiling residue to convert at least a substantial portion of the same into dibenzyl. In order to carry out such conversion, it is necessary only to react the high boiling residue with an excess of benzol in the presence of aluminum chloride.

For example, 50 grams of high boiling residue obtained from the reaction of benzol and ethylene dichloride were refluxed with 250 grams of benzol and 5 grams of anhydrous aluminum chloride. This high boiling residue was substantially free of ethylene dichloride. The temperature was maintained at approximately 82° C. After 5¾ hours the mixture was cooled, washed with water and the benzol distilled off. The balance of the product was distilled in a vacuum of 14 mm. up to a temperature of approximately 175° to remove therefrom practically all of the dibenzyl. It is found that this reaction produced 35 grams of dibenzyl and that only approximately 15 grams of the high boiling residue remained unconverted.

While the first method above described is to be preferred, the method of converting the high boiling residue into dibenzyl is also very effective to increase the yield of this product.

In carrying out the reaction between benzol and ethylene dichloride, substantial quantities of aluminum chloride are used. The cost of the reaction may be greatly decreased by using instead of a large quantity of aluminum chloride only a very small quantity of this reagent with metallic aluminum. It appears that once the reaction is started by the aluminum chloride, the metallic aluminum serves to continue the catalysis, and the efficiency of the reaction is not affected. It is probable that the hydrochloric acid formed in the reaction converts the metallic aluminum to aluminum chloride. For this purpose, any suitable amount of metallic aluminum may be used, preferably in the neighborhood of from 1 to 10 per cent of the weight of ethylene dichloride used. In this connection, it should be understood that the aluminum need not be pure and that, in fact, impure aluminum has actually been found to be even more effective than the pure metal.

The efficiency of the metallic aluminum may actually be increased by at least partially coating it with a very thin copper plate. This may be done by merely dipping the aluminum in a water solution of a copper salt. The copper salt solution causes metallic copper to be deposited on the surface of the aluminum. The copper plated aluminum is dried and is then ready for use. The resulting product, which is known as aluminum struck with copper, may be used in place of the pure aluminum and is highly effective in the above reaction. Although the reason for this action of the copper and aluminum is not known, it is believed that the electrolytic effect of the contact of the two metals serves to increase their catalytic action.

Although the reaction may be carried out in the presence of anhydrous aluminum chloride, any other suitable catalyst may be used. Any of the other catalysts which are known for use in Friedel-Crafts reactions may be used. As stated above, metallic aluminum in the presence of a very small quantity of aluminum chloride provides an effective catalyst. Similarly, such catalysts as the halides of chromium manganese, nickel, iron, boron, tin, zinc, antimony and cadmium may be used. Catalysts of this type including all of the specific catalysts named are referred to herein for convenience as Friedel-Crafts catalysts.

This application is a continuation-in-part of my co-pending application Serial No. 297,487, filed October 2, 1939.

The foregoing specific examples have been given for the purpose of illustrating the invention and means of practicing it. Changes and modifications may therefore be made in the process as set forth, particularly as to quantities of the reagents used and as to the conditions of the reactions without departing from the spirit and scope of my invention.

I claim:

1. A process of preparing dibenzyl which comprises mixing benzol with ethylene dichloride in the presence of a Friedel-Crafts catalyst and the high boiling residue of a previous reaction between benzol and ethylene dichloride, said residue being soluble in the reaction mixture and heating the mixture.

2. A process of preparing dibenzyl which comprises mixing ethylene dichloride with an excess of benzol in the presence of a Friedel-Crafts catalyst and the high boiling residue of a previous reaction between benzol and ethylene dichloride, said residue being soluble in the reaction mixture and heating the mixture.

3. A process as set forth in claim 2, wherein the weight of the high boiling residue is between 25% and 75% of the weight of the ethylene dichloride.

4. A process of preparing dibenzyl which comprises slowly mixing benzol with ethylene dichloride according to the ratio of approximately 8 mols of benzol to each mol of ethylene dichloride in the presence of a Friedel-Crafts catalyst and the high boiling residue of a reaction between benzol and ethylene dichloride, said residue being soluble in the reaction mixture and heating the mixture to complete the reaction.

5. A process of preparing dibenzyl which comprises slowly mixing benzol with ethylene dichloride according to the ratio of approximately 8 mols of benzol to each mol of ethylene dichloride, in the presence of anhydrous aluminum chloride, metallic aluminum, and the high boiling residue of the reaction between benzol and ethylene dichloride, said residue being soluble in the reaction mixture, the aluminum chloride, aluminum and high boiling residue being present in amounts equal to approximately 0.1%, 5% and 50% by weight respectively of the quantity of ethylene dichloride used, and heating the mixture to complete the reaction.

6. A process of preparing dibenzyl which comprises reacting an excess of benzol with ethylene dichloride in the presence of a small quantity of a Friedel-Crafts catalyst, washing the reaction products with water, distilling the reaction products to remove unreacted benzol, further distilling the reaction products to remove dibenzyl, and reacting the high boiling residue with ethylene dichloride and an excess of benzol in the absence of water and in the presence of a Friedel-Crafts catalyst.

7. A process of preparing dibenzyl which comprises treating metallic aluminum with a water solution of a copper salt, drying the aluminum product, adding the same to a mixture of ethylene dichloride and an excess of benzol and a very small quantity of anhydrous aluminum chloride, and heating the resulting mixture.

8. A process of preparing dibenzyl which comprises reacting the high boiling residue of a reaction between benzol and ethylene dichloride, said residue being free of ethylene dichloride, with benzol in the presence of a Friedel-Crafts catalyst.

9. A process of preparing dibenzyl which comprises reacting one part by weight of the high boiling residue of a reaction between benzol and ethylene dichloride, said residue being free of ethylene dichloride with approximately five parts of benzol in the presence of a small quantity of aluminum chloride.

10. A process of preparing dibenzyl which comprises reacting an excess of benzol with ethylene dichloride in the presence of aluminum chloride and the high boiling residue of a reaction between benzol and ethylene dichloride, distilling off the unreacted benzol, distilling in vacuum to obtain the dibenzyl, and reacting the high boiling residue with benzol and anhydrous aluminum chloride to produce additional dibenzyl.

ROBERT H. VAN SCHAACK, JR.